(12) United States Patent
Spaulding et al.

(10) Patent No.: US 9,200,707 B2
(45) Date of Patent: Dec. 1, 2015

(54) CONTROL OF AUTOMATIC TRANSMISSION SHIFT BY WIRE RANGE SELECTION

(75) Inventors: Todd C. Spaulding, Ann Arbor, MI (US); Brian J. Deurloo, Howell, MI (US); Mark E. Zyskowski, Dearborn, MI (US); Christopher L. Danks, Northville, MI (US); Matthew L. Fyie, Canton, MI (US); Charles C. Poon, Canton, MI (US); William R. Goodwin, Farmington Hills, MI (US); Richard R. Hathaway, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1138 days.

(21) Appl. No.: 12/890,936

(22) Filed: Sep. 27, 2010

(65) Prior Publication Data
US 2012/0078478 A1    Mar. 29, 2012

(51) Int. Cl.
*F16H 63/48*    (2006.01)

(52) U.S. Cl.
CPC .................................... *F16H 63/483* (2013.01)

(58) Field of Classification Search
USPC ......................................... 701/51, 52, 53, 54
See application file for complete search history.

(56) References Cited

U.S. PATENT DOCUMENTS

| | | | | |
|---|---|---|---|---|
| 2,610,518 A | * | 9/1952 | Goedeke et al. | ................. 74/365 |
| 2,933,945 A | * | 4/1960 | Brewster et al. | ............. 74/473.3 |
| 3,141,350 A | * | 7/1964 | Bevacqua et al. | ................. 477/99 |
| 4,884,057 A | * | 11/1989 | Leorat | ............................ 340/456 |
| 5,085,106 A | * | 2/1992 | Bubnash | ......................... 74/335 |
| 5,433,124 A | * | 7/1995 | Person | ............................ 74/335 |
| 5,437,204 A | * | 8/1995 | Person | ............................ 74/335 |
| 5,696,679 A | | 12/1997 | Marshall et al. | |
| 5,758,304 A | | 5/1998 | Bray | |
| 6,056,669 A | | 5/2000 | Marshall | |
| 6,139,468 A | | 10/2000 | Goates et al. | |
| 6,253,138 B1 | * | 6/2001 | Shober et al. | ................... 701/51 |
| 6,487,484 B1 | * | 11/2002 | Shober et al. | ................... 701/51 |
| 6,661,114 B2 | * | 12/2003 | Syamoto | ..................... 307/10.1 |
| 6,996,465 B2 | | 2/2006 | Kim | |
| 7,139,652 B2 | | 11/2006 | Kikuchi | |
| 7,143,857 B2 | | 12/2006 | Ichikawa et al. | |
| 7,349,770 B2 | | 3/2008 | Matsuzaki et al. | |
| 7,566,289 B2 | | 7/2009 | Inoue et al. | |
| 2004/0173431 A1 | | 9/2004 | DeVore et al. | |
| 2006/0229789 A1 | | 10/2006 | Krishnan et al. | |
| 2008/0242506 A1 | | 10/2008 | Hori et al. | |

FOREIGN PATENT DOCUMENTS

GB        2441337 A        5/2008

* cited by examiner

*Primary Examiner* — James Trammell
*Assistant Examiner* — James E Stroud
(74) *Attorney, Agent, or Firm* — James Dottavio; MacMillan, Sobanski & Todd, LLC

(57) ABSTRACT

A method for controlling a transmission includes using actuation of a button of a shift module to produce a signal representing a desired gear, using the signal and a second signal commanding a park range to determining a priority range, using a shift mechanism to attempt engagement of the transmission in the priority range, and if the priority range is park and park is not engaged, engaging a park brake.

17 Claims, 2 Drawing Sheets

CONTROL OF AUTOMATIC TRANSMISSION SHIFT BY WIRE RANGE SELECTION

BACKGROUND OF THE INVENTION

1. Field of the Invention

This invention relates generally to electrical shift-by-wire selection of a desired transmission operating range.

2. Description of the Prior Art

In a conventional automatic transmission system for a motor vehicle, a direct mechanical linkage connects a driver operated gear shift lever, whose movement actuates the transmission gear shift mechanism through a cable.

In a shift-by-wire system, this direct linkage is separated and an electronic system that includes solenoids or motors may be used to produce the intended position of the gear shift mechanism.

In a shift-by-wire system that uses a push button or multiple discrete input driver interfaces, several opportunities and challenges exist in providing gear shifting that is intuitive to the operator and delivers safe vehicle operation.

A need exists in the industry for a shift-by-wire system that uses in combination hardware that produces the shift-by-wire function, such as a vehicle operator interface and push buttons, and a method for controlling the system.

SUMMARY OF THE INVENTION

A method for controlling a transmission includes using actuation of a button of a shift module to produce a signal representing a desired gear, using the signal and a second signal commanding a park range to determining a priority range, using a shift mechanism to attempt engagement of the transmission in the priority range, and if the priority range is park and park is not engaged, engaging a park brake.

The manually operated push button interface is controlled by software without physical locks of the buttons that prevent actuation by the operator. The interface has multiple discrete inputs without need for mechanical lock-outs providing design and package space flexibility.

All of the interlocks are managed in software of three modules: a Gear Shift Module, the driver's interface; a Powertrain Control Module, which manages all of the interlocks for the shift system; and a Transmission Range Control Module, which executes the driver's request to shift the transmission to the appropriate gear or a preemptive command to engage the Park range.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
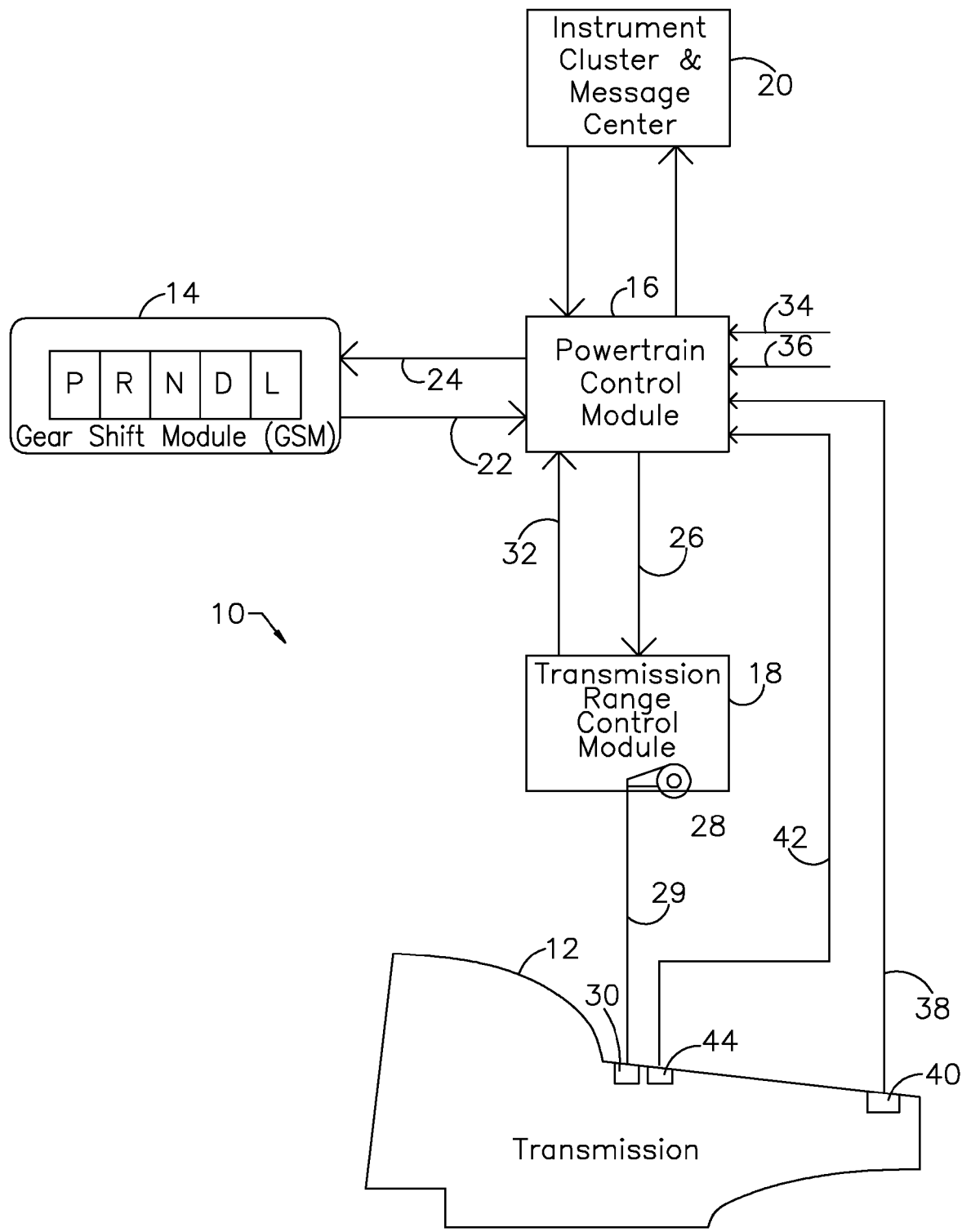
FIG. 1 is a schematic diagram of a shift-by-wire range selection system for an automatic transmission.

Referring now to FIG. 1, a shift-by-wire system 10 for an automatic transmission 12 includes a gear shift module (GSM) 14, powertrain control module (PCM) 16, transmission range control module (TRCM) 18, and instrument cluster and message center 20. The GSM 14, located in the passenger compartment of a vehicle, is the driver interface operated manually by the vehicle operator, who selects the desired transmission range by actuating a button corresponding to the desired range: Park (P), Reverse (R), Neutral (N), Drive (D) and Low (L). These input commands are translated by the system 10 to produce signals representing the vehicle operator's requests for the desired transmission gear or range. The PCM 16 is the decision maker, managing all of the interlocks for the shift system 10. The TRCM 18 executes the operator's requests to shift the transmission 12 to the appropriate gear or range and can trip its default-to-park mechanism causing transmission 12 immediately to produce the Park range.

The modules 14, 16, 18 and instrument cluster and message center 20 communicate over a communication area network (CAN). The operator's requests represented by signal 22 are carried from GSM 14 on the CAN to PCM 16, which sends signal 24 representing the current transmission range to GSM 14 where the current range is displayed or illuminated. Information and warning messages are carried from PCM 16 to the instrument cluster and message center 20, which sends requests, such as a request for the transmission to enter neutral-tow to the PCM.

PCM 16 transmits a signal 26 representing the commanded transmission range selected by the operator on the CAN to the TRCM 18. The TRCM 18 includes electric motors, which pivot a manual lever 28 connected by a shift cable 29 to the manual valve 30 of transmission 12. The transmission 12 produces the range that corresponds to the P, R, N and D position of the manual valve 30. TRCM 18 transmits a signal 32 representing the P, R, N and D position its manual lever 28 to the PCM 16.

Information related to the state of the vehicle's ignition switch and battery voltage is carried on lines 34 to PCM 16. Information related to the applied and released state of the vehicle's brake is carried on line 36 to PCM 16. A signal 38 produced by a speed sensor 40 representing the rotational speed of the transmission output shaft is transmitted to PCM 16. A signal 42 representing the current transmission range and produced by a transmission range sensor 44 is transmitted to PCM 16.

Figure 2:
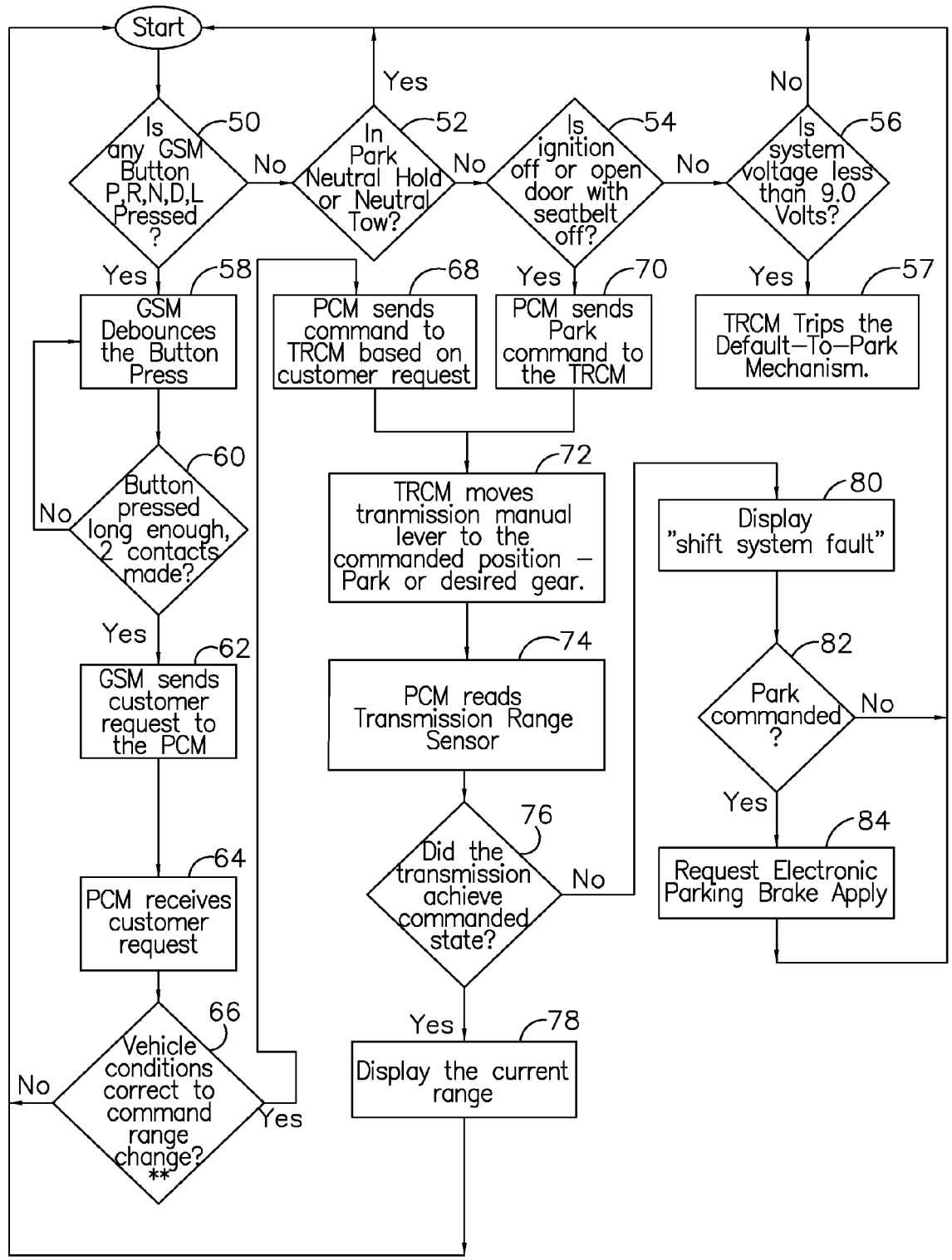
FIG. 2 is a logic diagram showing the steps of an algorithm that controls the system of FIG. 1.

FIG. 2 is a logic diagram showing the steps of an algorithm that controls system 10. At step 50, a test is made to determine whether any of the P, R, N, D, and L buttons of the GSM 14 is pressed. If the result of test 50 is logically false, at step 52 a test is made to determine whether system 10 is in Park, Neutral Hold or Neutral Tow. Neutral Hold is a special operating mode selected by the vehicle operator in situations where maintaining the transmission in Neutral is desired, e.g., when running the vehicle through a car wash. In the Neutral Hold mode, the Return to Park functions that require the driver's presence in the vehicle are disabled and the gear indication is maintained. Neutral Tow is a special operating mode selected by the vehicle operator for long term towing, e.g., when towing the vehicle behind a motor home. In the Neutral Tow mode, the return to Park functions that require the driver's presence in the vehicle are disabled, gear indication is shut down, and all gear selections are ignored until the Neutral Tow exit procedure is executed.

If the result of test 52 is logically true, the control returns to start and the algorithm is re-executed.

If the result of test 52 is false, at step 54 a test is made to determine whether the ignition switch is off or a door is open and the corresponding seat belt is unlatched.

If the result of test 54 is false, at step 56 a test is made to determine whether the vehicle's battery voltage is less than nine volts.

If the result of test 56 is false, the control returns to start and the algorithm is re-executed. If the result of test 56 is true, at step 57 TRCM 18 trips its default-to-park mechanism, causing transmission 12 to produce the Park range.

If the result of test 50 is true, at step 58 GSM 14 debounces the pressed button. A debounce procedure verifies that a button has been pressed by monitoring the three output contacts associated with a single activated button to determine that two of the three contacts indicate that the button has been depressed for a period whose length is at least equal to that of a reference period.

At step 60, a test is made to determine whether the pressed button is held activated longer than a reference period, or two of the contacts are made.

If the result of test 60 is false, the control returns to step 58. If the result of test 60 is true, at step 62 GSM 14 transmits the operator's transmission range request to PCM 16, which request is received by the PCM at step 64.

At step 66 a test is made to determine whether certain vehicle conditions are present such that a range change can be executed. The requisite conditions requires a check of the operational condition of some or all of the following vehicle components and the magnitude of vehicle parameters: vehicle speed, brake shift interlock, status of the ignition switch, open and closed state of the operator's door, battery voltage, operation of the CAN, PWM inputs to the shift-by-wire system in the TRCM 18, presence of a neutral-tow request, status of the neutral tow, latched status of the operator's seatbelt, operating status of the GSM's park override subsystem, operating status of the GSM button stuck subsystem, and operating status of the TRCM's default-to-park system.

If the result of test 66 is false, the control returns to start and the algorithm is re-executed. If the result of test 66 is true, indicating that the necessary conditions are present for a transmission range change, at step 68 PCM 16 sends command signal 26 to TRCM 18.

If the result of test 54 is true, at step 70 PCM 16 sends a Park command signal 26 to TRCM 18.

At step 72, TRCM 18 moves manual lever 28 to the commanded position.

At step 74, PCM 16 reads signal 42 produced by the transmission range sensor 44.

At step 76 a test is made to determine whether transmission 12 has performed a range change to the range commanded in step 72. If the result of test 76 is true, at step 78 the current range is displayed by the instrument cluster and message center 20.

If the result of test 76 is false, indicating that the commanded transmission range is not engaged, at step 80 the instrument cluster and message center 20 indicates a 'shift system fault' message.

At step 82 a test is made to determine whether the transmission range commanded at step 72 is the Park range. If the result of test 82 is true, at step 84 PCT 16 issues a command that produces electrical engagement of the park brake.

If the result of test 82 is false or following execution of step 84, control returns to start and the algorithm is re-executed.

In accordance with the provisions of the patent statutes, the preferred embodiment has been described. However, it should be noted that the alternate embodiments can be practiced otherwise than as specifically illustrated and described.

The invention claimed is:

1. A method for controlling a transmission, comprising:
 (a) using shift module button actuation to produce a signal representing a desired gear;
 (b) automatically producing a second signal representing park, provided engine ignition is off or a seatbelt is unlatched, and additionally neutral hold and neutral tow are unselected;
 (c) commanding park engagement if the second signal is present, otherwise commanding desired gear engagement;
 (d) if park is commanded and park remains disengaged, engaging a park brake.

2. The method of claim 1, wherein step (a) is executed provided said button actuation extends for a period at least equal to a length of a reference period.

3. The method of claim 1, wherein step (a) further comprises:
 awaiting the signal, provided the transmission is engaged in park, neutral hold or neutral tow.

4. The method of claim 1 wherein step (a) further comprises determining that vehicle conditions and operational vehicle components required for a change in a transmission range are present.

5. The method of claim 4 further comprising determining:
 whether vehicle conditions warrant a transmission range change, wherein said vehicle conditions include at least one of operation of a brake shift interlock, vehicle speed, status of an ignition switch, opened and closed state of a vehicle door, battery voltage, operation of a communications network onboard the vehicle, presence of a neutral-tow request, status of a neutral hold, latched status of a vehicle operator's seatbelt, operating status of a park override, operating status of a button stuck check, and operating status of a default-to-park mechanism.

6. The method of claim 1, further comprising displaying a shift fault, if a priority range is not engaged.

7. The method of claim 1, further comprising:
 if a priority range is engaged, displaying a currently engaged transmission range.

8. The method of claim 1, wherein step (c) further comprises:
 determining that a priority range is park, if one of an ignition switch is off, a vehicle door is open, and a seatbelt of an occupied seat is unlatched.

9. The method of claim 1, wherein step (c) further comprises:
 determining that a priority range is park, if one of an ignition switch is off, a vehicle door at the driver's position is open, and a seatbelt for the driver's seat is unlatched.

10. The method of claim 1, wherein step (c) further comprises:
 if a voltage of a battery used to actuate the shift mechanism is less than a reference voltage, using the shift mechanism to engage the transmission in the park range.

11. A method for controlling a transmission, comprising:
 (a) producing a signal representing a desired gear in response to an input to a driver interface;
 (b) automatically producing a second signal representing park, provided engine ignition is off or a seatbelt is unlatched, and additionally neutral hold and neutral tow are unselected;

(c) if the second signal is present, commanding park engagement, otherwise commanding engagement of the desired gear;

(d) if the commanded gear is not engaged, displaying a shift fault;

(e) if park is commanded and park remains disengaged, engaging a park brake.

12. The method of claim 11, wherein step (a) further comprises:

awaiting the signal, provided the transmission is engaged in park, neutral hold or neutral tow.

13. The method of claim 11, wherein step (a) further comprises:

awaiting the signal, provided the transmission is engaged in park, neutral hold or neutral tow, an ignition switch is on, a driver's door is closed, a driver's seatbelt is latched and a voltage of a battery used to actuate the shift mechanism is equal to or greater than a reference voltage.

14. The method of claim 11 wherein step (a) further comprises determining that vehicle conditions and operational vehicle components required for a change in a transmission range are present.

15. The method of claim 14 further comprising:

determining whether vehicle conditions warrant a transmission range change, wherein said vehicle conditions include at least one of operation of a brake shift interlock, vehicle speed, status of an ignition switch, opened and closed state of a vehicle door, battery voltage, operation of a communications network onboard the vehicle, presence of a neutral-tow request, status of a neutral hold, latched status of a vehicle operator's seatbelt, operating status of a park override, operating status of a button stuck check, and operating status of a default-to-park mechanism.

16. The method of claim 11, wherein step (b) further comprises:

if a voltage of a battery used to actuate the shift mechanism is less than a reference voltage, using the shift mechanism to engage the transmission in the park range.

17. The method of claim 11, further comprising:

displaying a currently engaged transmission range.

\* \* \* \* \*